US012665266B2

(12) United States Patent
Fang

(10) Patent No.: US 12,665,266 B2
(45) Date of Patent: Jun. 23, 2026

(54) BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventor: Kun Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 911 days.

(21) Appl. No.: 17/973,741

(22) Filed: Oct. 26, 2022

(65) Prior Publication Data

US 2023/0049457 A1 Feb. 16, 2023

Related U.S. Application Data

(63) Continuation of application No. PCT/CN2021/132201, filed on Nov. 22, 2021.

(30) Foreign Application Priority Data

Dec. 21, 2020 (CN) .......................... 202011518512.9

(51) Int. Cl.
H01M 50/533 (2021.01)
H01M 50/534 (2021.01)
(Continued)

(52) U.S. Cl.
CPC ....... H01M 50/533 (2021.01); H01M 50/534 (2021.01); H01M 50/536 (2021.01);
(Continued)

(58) Field of Classification Search
CPC ............. H01M 50/533; H01M 50/534; H01M 50/536; H01M 50/548; H01M 50/559;
(Continued)

(56) References Cited

U.S. PATENT DOCUMENTS

| | | | | |
|---|---|---|---|---|
| 6,228,536 | B1 * | 5/2001 | Wasynczuk ............. | H01M 4/64 |
| | | | | 429/231.95 |
| 2004/0128826 | A1 | 7/2004 | Nakanishi et al. | |

(Continued)

FOREIGN PATENT DOCUMENTS

| | | |
|---|---|---|
| CN | 206332097 U | 7/2017 |
| CN | 207474594 U | 6/2018 |

(Continued)

OTHER PUBLICATIONS

The World Intellectual Property Organization (WIPO) International Search Report and Written Opinion for PCT/CN2021/132201 Feb. 17, 2022 12 pages (including English translation).

(Continued)

*Primary Examiner* — Matthew W Van Oudenaren

(74) *Attorney, Agent, or Firm* — ANOVA LAW GROUP, PLLC

(57) ABSTRACT

A battery cell includes an electrode assembly including a first tab and a second tab located on two ends of the electrode assembly, respectively, in a first direction. The battery cell further includes a first electrode terminal and a second electrode terminal located on two sides of the electrode assembly, respectively, in the first direction, a first adapter configured to couple the first tab and the first electrode terminal, and a second adapter configured to couple the second tab and the second electrode terminal. The first adapter and the second adapter each comprise at least two non-bending portions and at least one bending portion each connecting two adjacent ones of the at least two non-bending portions. A number of the at least two non-bending portions of the second adapter is greater than a number of the at least two non-bending portions of the first adapter.

20 Claims, 11 Drawing Sheets

(51) Int. Cl.

| | |
|---|---|
| H01M 50/536 | (2021.01) |
| H01M 50/548 | (2021.01) |
| H01M 50/559 | (2021.01) |
| H01M 50/566 | (2021.01) |

(52) U.S. Cl.

CPC ....... *H01M 50/548* (2021.01); *H01M 50/559* (2021.01); *H01M 50/566* (2021.01); *H01M 2220/20* (2013.01)

(58) Field of Classification Search

CPC ............. H01M 50/566; H01M 50/107; H01M 50/152; H01M 10/0422

See application file for complete search history.

(56) References Cited

U.S. PATENT DOCUMENTS

| | | | | |
|---|---|---|---|---|
| 2006/0204841 | A1* | 9/2006 | Satoh | .................. H01M 50/533 |
| | | | | 29/623.2 |
| 2013/0062952 | A1* | 3/2013 | Park | ................. H01M 10/4257 |
| | | | | 307/71 |
| 2014/0030568 | A1* | 1/2014 | Hato | ................... H01M 50/533 |
| | | | | 429/94 |

FOREIGN PATENT DOCUMENTS

| | | | |
|---|---|---|---|
| CN | 108428921 | * | 8/2018 |
| CN | 208298952 | U | 12/2018 |
| CN | 209658320 | U | 11/2019 |
| CN | 209786120 | U | 12/2019 |
| CN | 111106300 | A | 5/2020 |
| CN | 211929598 | U | 11/2020 |
| EP | 3748732 | A1 | 12/2020 |
| JP | 2009104925 | A | 5/2009 |
| JP | 2012248466 | A | 12/2012 |
| JP | 2019009057 | A | 1/2019 |
| JP | 7355109 | B2 | 10/2023 |
| KR | 20180126928 | * | 11/2018 |
| WO | 2019054312 | A1 | 3/2019 |

OTHER PUBLICATIONS

The European Patent Office (EPO) The Extended European Search Report for Application No. 21908984.4 Feb. 12, 2024 8 Pages.

The Japan Patent Office (JPO) Notification of Reasons for Refusal for Application No. 2022-568843 Dec. 25, 2023 8 Pages (including translation).

The Korean Intellectual Property Office Request for the Submission of an Opinion for Application No. 10-2022-7039367 May 9, 2025 15 Pages (including translation).

* cited by examiner

1

10

20

BATTERY CELL, BATTERY, AND ELECTRIC APPARATUS

CROSS-REFERENCE TO RELATED APPLICATIONS

This application is a continuation of International Application No. PCT/CN2021/132201, filed on Nov. 22, 2021, which claims priority to Chinese Patent Application No. 202011518512.9, filed on Dec. 21, 2020 and entitled "BATTERY CELL, BATTERY, AND ELECTRIC APPARATUS", the entire contents of both of which are incorporated herein by reference.

TECHNICAL FIELD

This application relates to the field of battery technologies, and in particular, to a battery cell, a battery, and an electric apparatus.

BACKGROUND

Due to advantages such as small size, low self-discharge, zero memory effect, high safety, and environmental friendliness, rechargeable batteries, as promising secondary batteries and chemical energy storage power sources, have been widely used in electric vehicles, energy storage, communication and other fields.

With an increasingly high requirement for endurance mileage of electric vehicles, rechargeable batteries are required to have a longer battery life. A key factor that determines battery life is energy density of batteries, which is generally increased by increasing the volume of electrode assemblies. A larger volume of the electrode assemblies leads to a larger volume of the rechargeable batteries. However, the space for batteries in the electric vehicles is generally limited, making it difficult to assemble battery groups in such limited space.

SUMMARY

This application provides a battery cell, a battery, and an electric apparatus, to increase energy density of the battery.

In one aspect, this application provides a battery cell, including: an electrode assembly, including a first tab and a second tab, where the first tab and the second tab are respectively located on two ends of the electrode assembly in a first direction; a first electrode terminal and a second electrode terminal, where the first electrode terminal and the second electrode terminal are respectively located on two sides of the electrode assembly in the first direction; a first adapter, configured to connect the first tab and the first electrode terminal; and a second adapter, configured to connect the second tab and the second electrode terminal, where the first adapter and the second adapter each include at least two non-bending portions and a bending portion that connects two adjacent ones of the non-bending portions; and the number of the non-bending portions of the second adapter is greater than the number of the non-bending portions of the first adapter. The battery cell according to embodiments of this application includes the first adapter and the second adapter, where the first adapter and the second adapter each include at least two non-bending portions and a bending portion that connects two adjacent ones of the non-bending portions. The first adapter and the second adapter are both of a stacking structure, occupying small space and increasing space utilization of the battery cell.

Compared with the number of the non-bending portions of the second adapter, the number of the non-bending portions of the first adapter is reduced, equivalent to reducing bending times of the first adapter and reducing space usage of the first adapter, which can further increase space utilization of the battery cell, increase energy density of the battery, and prolong battery life.

According to an embodiment of this application, the at least two non-bending portions of the first adapter include a first non-bending portion and a second non-bending portion, where the first non-bending portion is connected to the first electrode terminal, and the second non-bending portion is connected to the first tab; and the at least two non-bending portions of the second adapter include a third non-bending portion, a fourth non-bending portion, and a fifth non-bending portion, where the third non-bending portion is connected to the second electrode terminal, the fourth non-bending portion is connected to the second tab, and the fifth non-bending portion is provided between the third non-bending portion and the fourth non-bending portion. For the stacked first adapter, the first electrode terminal and the first tab do not need to be welded to the entire first adapter, greatly reducing the welding difficulty.

According to an embodiment of this application, resistivity of the second adapter is smaller than that of the first adapter. A resistance difference between the first adapter and the second adapter is reduced, so that heat produced by the first adapter is close to that produced by the second adapter, thereby improving consistency of the battery cell.

According to an embodiment of this application, the first adapter is made of aluminum, and the second adapter is made of copper.

According to an embodiment of this application, length of the second adapter is greater than that of the first adapter, achieving more balanced heat distribution for the first adapter and the second adapter.

According to an embodiment of this application, minimum thickness of the bending portion is smaller than that of the non-bending portion. The first adapter and the second adapter are easier to bend, allowing them to be placed into the housing more easily. A gap at a bending position of the stacked first adapter formed by bending and the second adapter is smaller, increasing space utilization of the battery cell.

According to an embodiment of this application, the bending portion includes a transition section, the transition section is connected to the non-bending portion, and thickness of the transition section decreases in a direction leaving the non-banding portion connected to the transition section. Stress applied to a joint between the bending portion and its connected non-bending portion can be reduced to reduce possibility of fracture of the first adapter and the second adapter.

According to an embodiment of this application, the first electrode terminal runs through and is connected to the non-bending portion of the first adapter. A position at which the first electrode terminal is welded to the first adapter can be accurately determined to enhance welding yield.

According to an embodiment of this application, the first electrode terminal includes a first terminal body, a first platform portion and a first protruding portion that are separately connected to the first terminal body, the first protruding portion runs through and is connected to the non-bending portion of the first adapter, and the first platform portion abuts against a side of the non-bending portion of the first adapter facing away from the first tab. The first platform portion is configured to limit the displacement of the first protruding portion in a first direction, preventing the first electrode terminal from slipping out of the first adapter before welding.

In another aspect, this application further provides a battery, including the battery cell according to the foregoing embodiments. Battery life can be prolonged by increasing energy density of the battery cell.

In still another aspect, this application provides an electric apparatus, including the battery cell or the battery according to the foregoing embodiments. The battery cell or the battery is configured to supply electrical energy. Duration performance of the electric apparatus can be improved by increasing energy density of the battery cell.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1A:
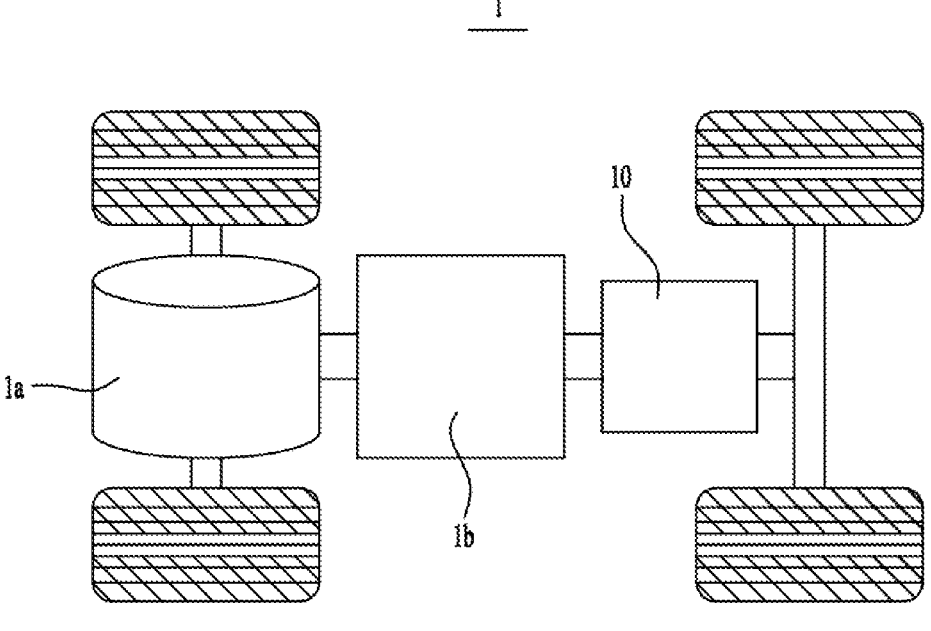
FIG. 1A is a schematic structural diagram of a vehicle disclosed in an embodiment of this application.

The accompanying drawings are not drawn to scale. The reference signs are as follows: 1. vehicle; 1*a*. motor; 1*b*. controller; 10. battery; 11. first portion; 12. second portion; 20. battery module; 30. shell; 31. barrel body; 32. first cover body; 33. second cover body; 40. battery cell; 50. housing; 60. electrode assembly; 61. first tab; 62. second tab; 70. end cover; 801. first electrode terminal; 81. first terminal body; 82. first platform portion; 83. first protruding portion; 802. second electrode terminal; 84. second terminal body; 85. second platform portion; 86. second protruding portion; 90. first adapter; 91. first non-bending portion; 92. second non-bending portion; 100. second adapter; 110. third non-bending portion; 111. first through hole; 120. fifth non-bending portion; 121. second through hole; 140. fourth non-bending portion; 130. bending portion; 131. transition section; and 132. middle section.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application. This application is not limited to the embodiments described herein.

In the description of this application, it should be noted that, unless otherwise stated, "a plurality of" means two or more; and the orientations or positional relationships indicated by the terms "upper", "lower", "left", "right", "inside", "outside", and the like are merely intended to help the description of this application and simplify the description rather than indicate or imply that the apparatuses or components must have specific orientations, or be constructed and manipulated according to specific orientations. Therefore, these terms shall not be construed as limitations on this application. In addition, the terms "first", "second", and "third", and the like are merely intended for a purpose of description, and shall not be understood as an indication or implication of relative importance. "Vertical" is not strictly vertical, but within an allowable range of error. "Parallel" is not strictly parallel, but within an allowable range of error.

The orientation terms appearing in the following description all express orientations shown in the drawings, and do not limit the specific structure of this application. In the description of this application, it should be further noted that unless otherwise specified and defined explicitly, the terms "mount", "connect", and "join" should be understood in their general senses. For example, they may refer to a fixed connection, a detachable connection, or an integral connection; and they may refer to a direct connection or an indirect connection via an intermediate medium. A person of ordinary skill in the art can understand specific meanings of these terms in this application as appropriate to specific situations.

The applicants have noticed that battery energy density of an existing battery cell is generally increased by increasing volume of electrode assemblies, but a larger volume of the electrode assemblies will lead to a larger volume of other assemblies associated with the electrode assemblies, such as a housing for accommodating the electrode assemblies. This will increase the overall space occupied by the battery cell, not conducive to assembling of multiple groups of battery cells in a limited space, and will also greatly increase invested costs, not conducive to actual implementation. In order to prevent the unfavorable problems caused by a larger volume of the battery cell, the applicants have increased space utilization from the perspective of internal space utilization of battery cells, so as to increase energy density of a battery. The applicants have designed the structural type of adapters, and found that a stacked adapter formed by bending occupies less space and that the stacked adapter has a powerful current flow capacity, which can greatly increase space utilization and energy density of the battery. The positive and negative electrode adapters generally adopt a structure with the same number of layers. However, the applicants have found that even if the number of layers of the adapter at one end is reduced, a production requirement can still be met. Therefore, use of the positive and negative electrode adapters with the same number of layers causes a waste of internal space of the battery cell and reduces space utilization.

Based on the foregoing problems discovered by the applicants, the applicants have improved the structure of the battery cell. The following further describes the embodiments of this application.

For better understanding of this application, the following describes the embodiments of this application with reference to FIG. 1A to FIG. 15.

An embodiment of this application provides an electric apparatus using a battery 10 as a power supply. The electric apparatus may be, but is not limited to, a vehicle, a ship, an aircraft, or the like. As shown in FIG. 1A, an embodiment of this application provides a vehicle 1. The vehicle 1 may be an oil-fueled vehicle, a gas-fueled vehicle, or a new energy vehicle. The new energy vehicle may be a battery electric vehicle, a hybrid electric vehicle, an extended-range electric vehicle, or the like. In an embodiment of this application, the vehicle 1 may include a motor 1a, a controller 1b, and a battery 10. The controller 1b is configured to control the battery 10 to supply power to the motor 1a. The motor 1a is connected to wheels through a transmission mechanism to drive the vehicle 1 to move. The battery 10 may be used as a driving power supply of the vehicle 1, replacing or partially replacing fuel oil or natural gas to provide driving power for the vehicle 1. In an example, the battery 10 may be disposed at the bottom, the front, or the rear of the vehicle 1. The battery 10 may be configured to supply electricity to the vehicle 1. In an example, the battery 10 may be used as an operating power supply for the vehicle 1 and applied to a circuit system of the vehicle 1. For example, the battery 10 may be configured to meet power usage requirements of the vehicle 1 for starting, navigating, and operating.

Figure 1B:
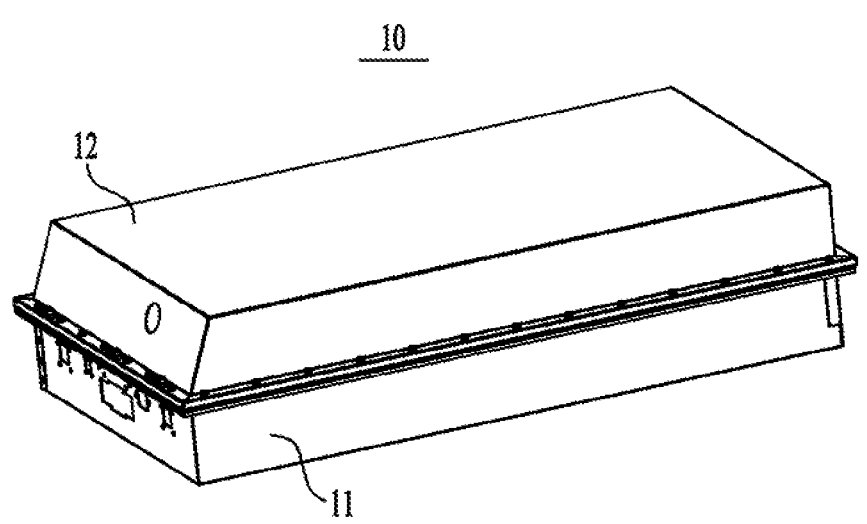
FIG. 1B is a schematic structural diagram of a battery disclosed in an embodiment of this application.

As shown in FIG. 1B, the battery 10 includes a box body. The box body is not limited to a specific type. The box body may be a frame-shaped box body, a disk-shaped box body, a box-shaped box body, or the like. For example, the box body includes a first portion 11 and a second portion 12 that is engaged to the first portion 11. The second portion 12 is engaged to the first portion 11 to form an accommodating portion.

Figure 2:
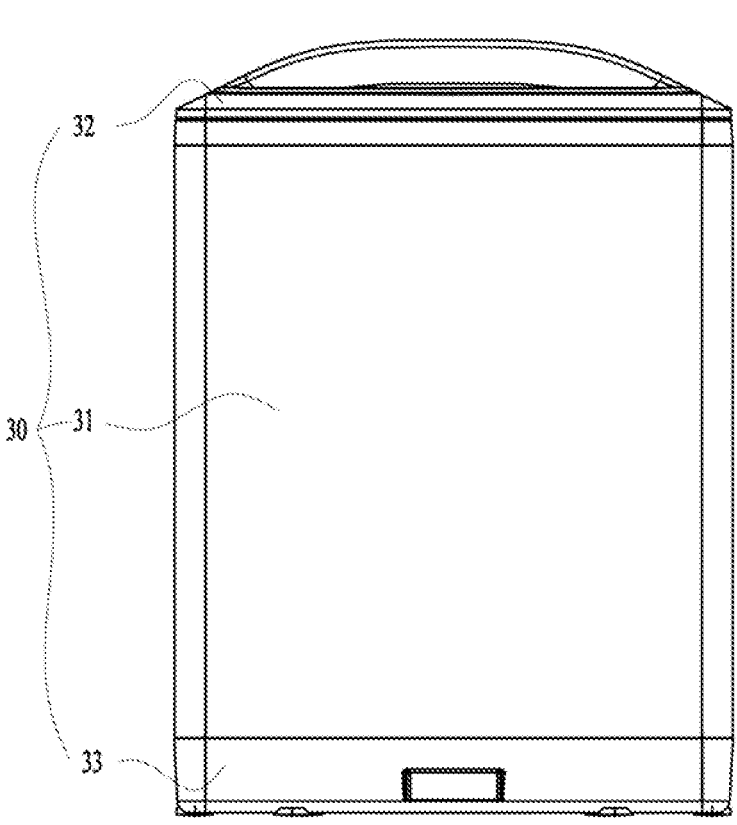
FIG. 2 is a schematic structural diagram of a battery module disclosed in an embodiment of this application.

FIG. 2 illustratively shows a battery module 20 according to an embodiment, and the battery module 20 is disposed in the box body. The battery module 20 includes a plurality of battery cells 40.

In some embodiments, to meet different power usage requirements, the battery 10 may include a plurality of battery cells 40, where the plurality of battery cells 40 may be connected in series, parallel, or series and parallel, and being connected in series and parallel means a combination of series and parallel connections. In other words, the plurality of battery cells 40 may be directly disposed in the accommodating portion of the box body to form the battery 10.

Figure 3:
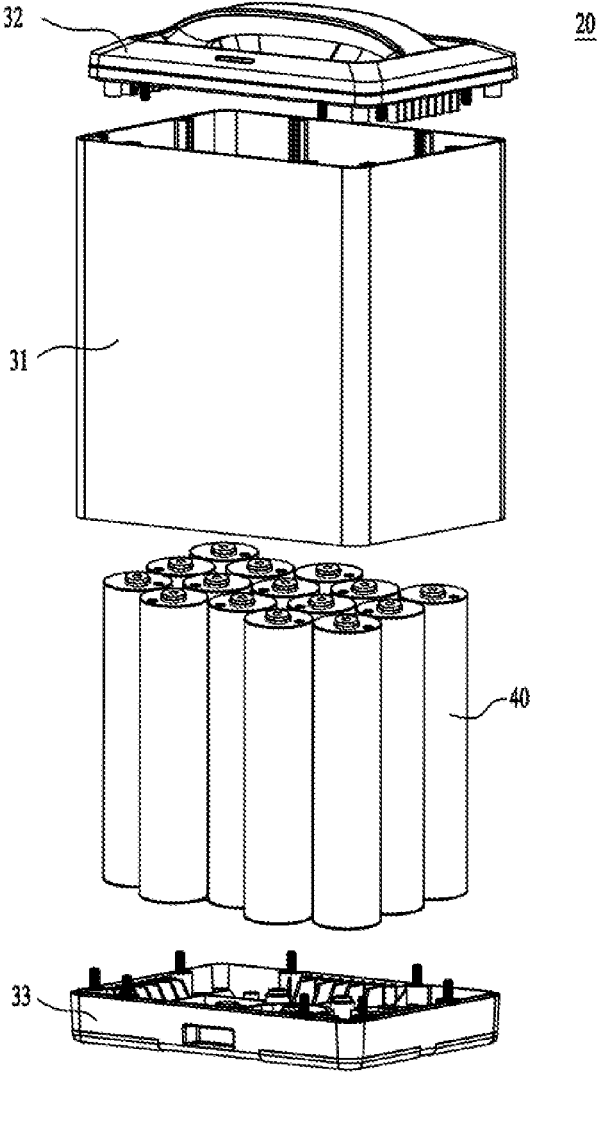
FIG. 3 is a schematic structural exploded view of a battery module disclosed in an embodiment of this application.

As shown in FIG. 2 and FIG. 3, the battery module 20 includes a shell 30 and the battery cells 40 disposed in the shell 30. In an example, the shell 30 includes a barrel body 31, a first cover body 32, and a second cover body 33. The first cover body 32 and the second cover body 33 are respectively disposed on two ends of the barrel body 31. The first cover body 32 and the second cover body 33 may be detachably connected to the barrel body 31 separately. For example, the first cover body 32 and the second cover body 33 are snap-connected to the barrel body 31 or connected to the barrel body 31 by using a screw. The barrel body 31, the first cover body 32, and the second cover body 33 are assembled to form an accommodating space. The battery cell 40 is disposed in the accommodating space of the shell 30.

It should be understood that the structure of the shell 30 is not limited to the above-mentioned embodiments. For example, the shall 30 is formed by snapping two open cover-shaped portions, as long as a plurality of battery cell 40 can be assembled.

Figure 4:
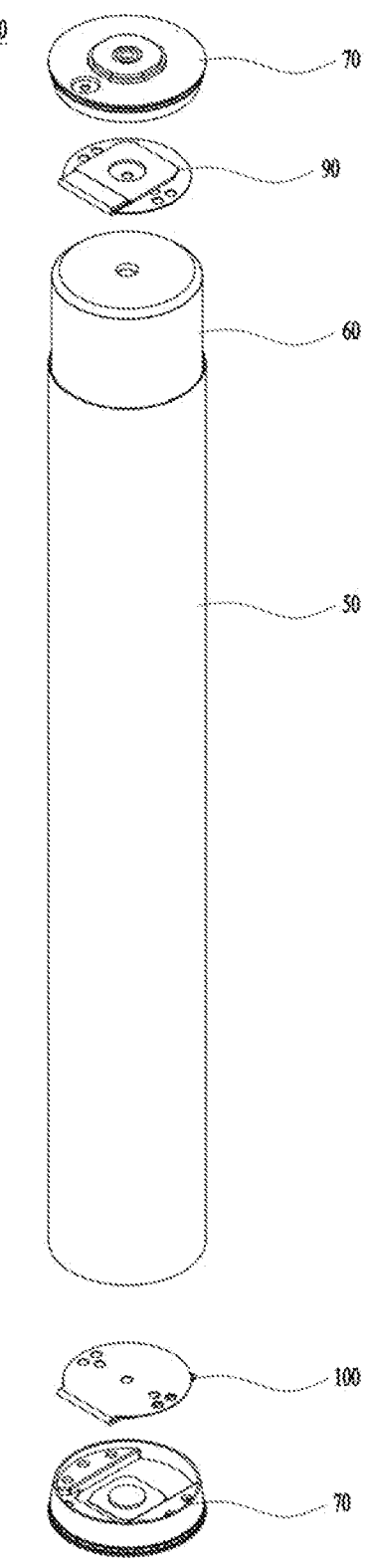
FIG. 4 is a schematic structural exploded view of a battery cell disclosed in an embodiment of this application.

Referring to FIG. 4, a battery cell 40 in an embodiment of this application includes a housing 50 and an electrode assembly 60 disposed in the housing 50. The housing 50 in this embodiment of this application is of a cylinder structure or of other structures. The housing 50 is provided with an inner space for accommodating the electrode assembly 60 and an electrolyte and an opening in communication with the inner space. The housing 50 may be made of materials such as aluminum, aluminum alloy, plastic, or the like. The electrode assembly 60 in this embodiment of this application may be formed by stacking or winding a first electrode plate, a second electrode plate, and a separator, where the separator is an insulator sandwiched between the first electrode plate and the second electrode plate. In this embodiment, the first electrode plate is a positive electrode plate, and the second electrode plate is a negative electrode plate. The positive electrode plate and the negative electrode plate each include a coating area and a non-coating area. A coating area of the positive electrode plate is coated with a positive electrode active substance, and a coating area of the negative electrode plate is coated with a negative electrode active substance. On the coating area, the active substance is applied to a current collector formed by a metal sheet, and no active substance is applied to the non-coating area.

Figure 5:
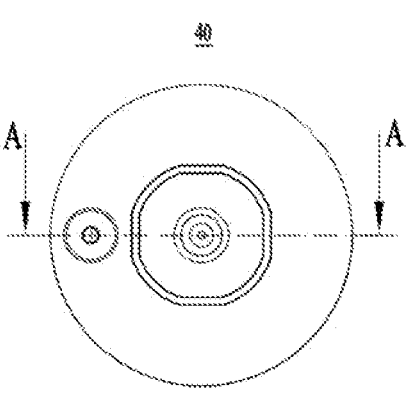
FIG. 5 is a vertical view of FIG. 4.
Figure 6:
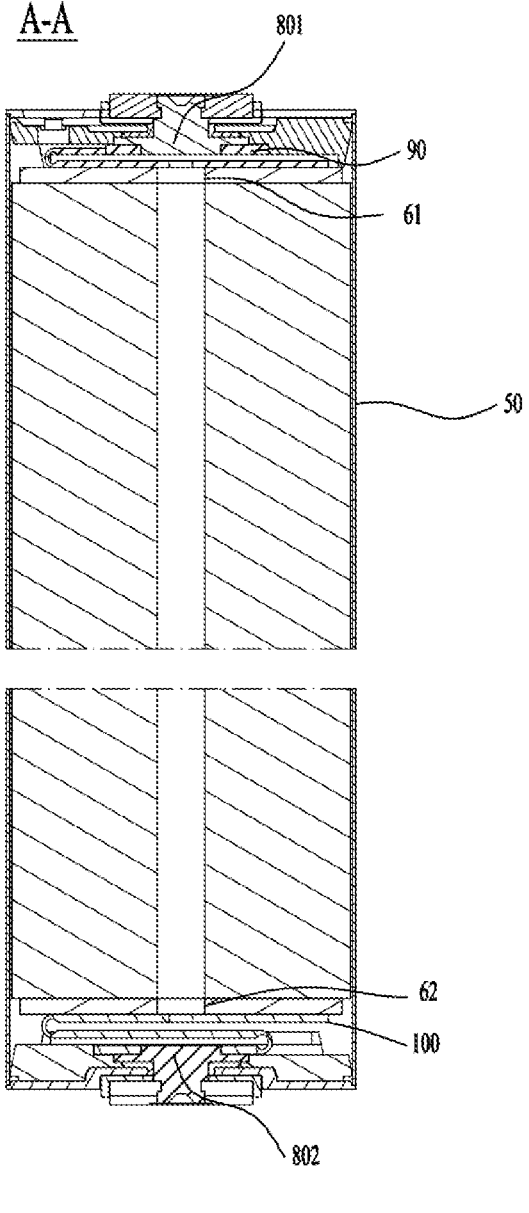
FIG. 6 is a schematic cross-sectional view of a structure along the A-A direction in FIG. 5.

As shown in FIG. 5 and FIG. 6, the electrode assembly 60 includes a body portion, a first tab 61, and a second tab 62. The body portion has two ends arranged opposite each other. The first tab 61 and the second tab 62 are respectively disposed on two ends of the electrode assembly 60 in a first direction. It can be understood that the first direction may be a length direction of the electrode assembly 60. In this embodiment, for example, the first tab 61 is a positive tab, and the second tab 62 is a negative tab. The non-coating areas of the positive electrode plate are stacked to form the positive tab, and the non-coating areas of the negative electrode plate are stacked to form the negative tab. The positive tab and the negative tab each extend from an end of the body portion.

As shown in FIG. 4 and FIG. 6, the battery cell 40 in this embodiment of this application further includes an end cover assembly, where the end cover assembly includes an end cover 70, an electrode terminal, and an adapter. The end cover 70 is sealedly connected to the housing 50. The electrode terminal is disposed on the end cover 70. The electrode terminal is electrically connected to the electrode assembly 60 through the adapter. The adapter guides current for the electrode terminal and the electrode assembly 60, thereby ensuring normal current conduction of the electrode terminal and the electrode assembly 60. The end cover 70, the electrode terminal, and the adapter are all provided in two. Each of two sides of the electrode assembly 60 in the first direction (that is, two opposite sides in the length direction of the electrode assembly 60) is correspondingly provided with one end cover assembly.

Figure 7:
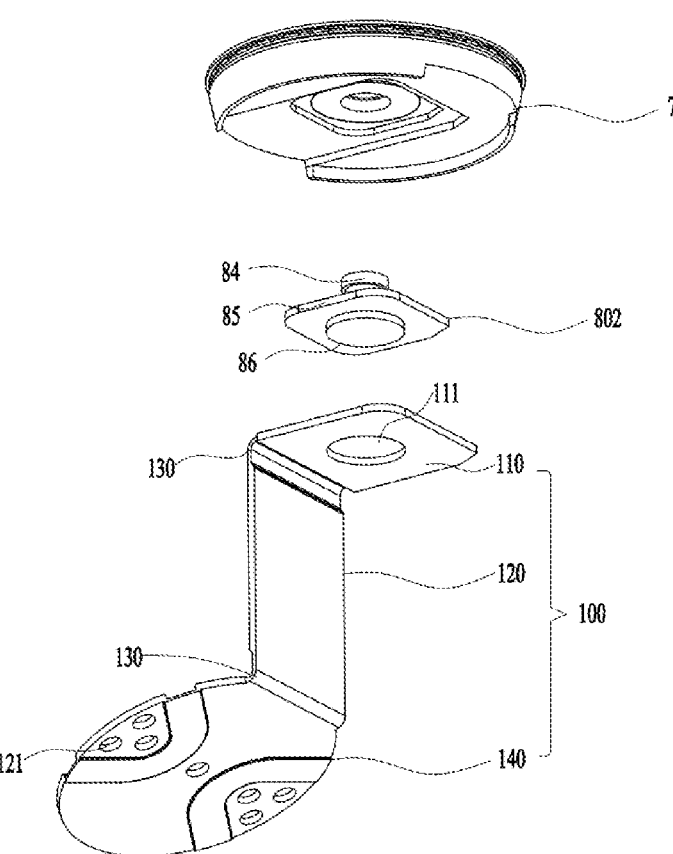
FIG. 7 is an exploded view of a second end cover assembly.
Figure 8:
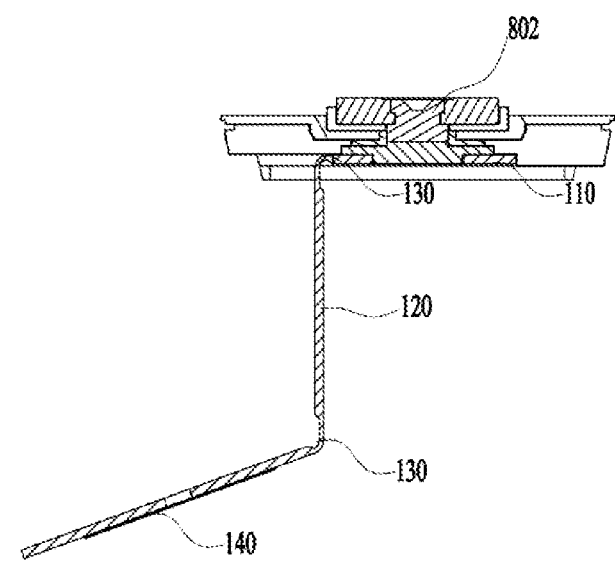
FIG. 8 is an exploded view of a second end cover assembly.
Figure 9:
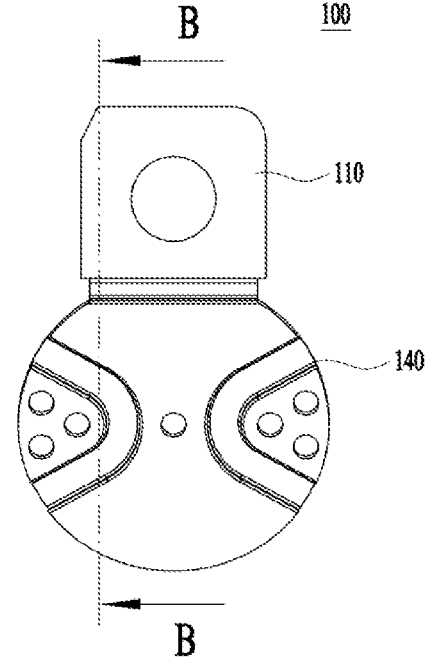
FIG. 9 is a schematic structural diagram of a second adapter in a non-bending state.
Figure 10:
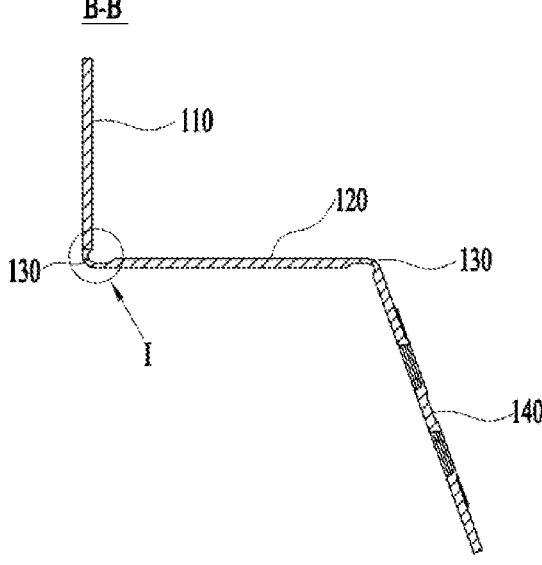
FIG. 10 is a schematic structural diagram of a second adapter in a non-bending state.
Figure 11:
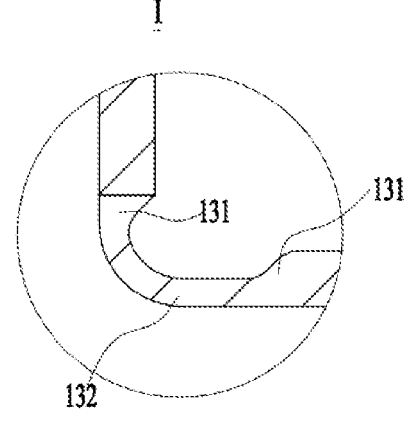
FIG. 11 is an enlarged view of Part I in FIG. 10.
Figure 12:
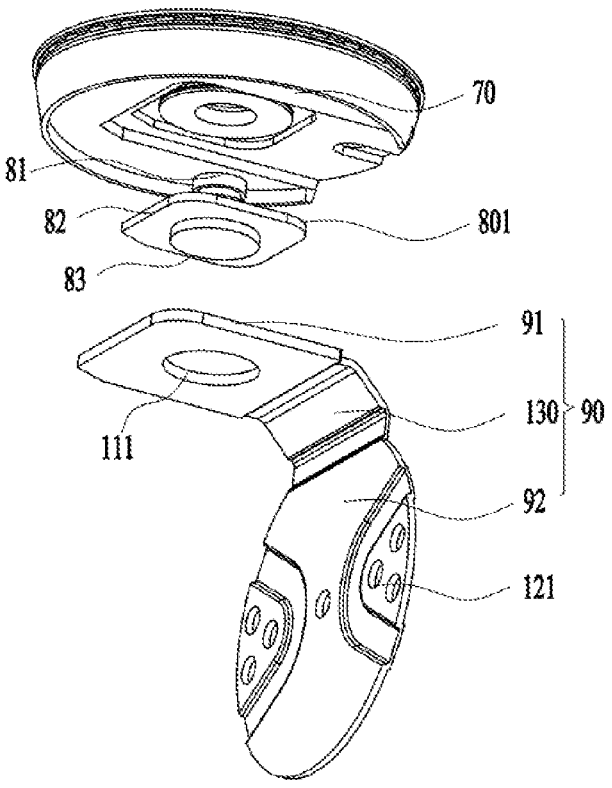
FIG. 12 is an exploded view of a first end cover assembly.
Figure 13:
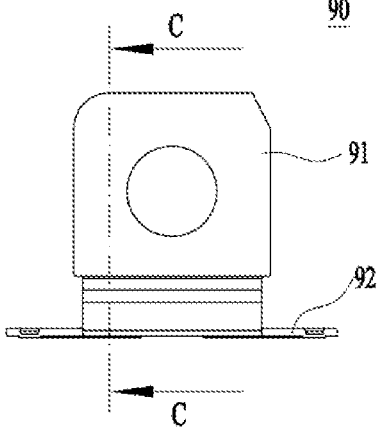
FIG. 13 is a schematic structural diagram of a first adapter in a non-bending state.
Figure 14:
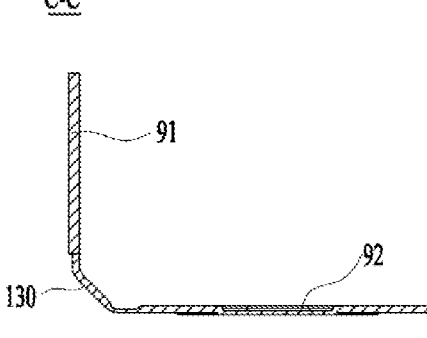
FIG. 14 is a schematic cross-sectional view of a structure along the C-C direction of a first adapter.

Referring to FIG. 6, FIG. 7, and FIG. 12, an adapter of the battery cell shown in FIG. 6 is a structure in a bending state; an adapter of the second end cover assembly shown in FIG. 7 is a structure in a non-bending state; and an adapter of the first end cover assembly shown in FIG. 12 is a structure in a non-bending state. For example, the first end cover assembly and the second end cover assembly are respectively provided on two sides of the electrode assembly 60 in the first direction. The first end cover assembly includes an end cover 70, a first electrode terminal 801, and a first adapter 90. The first electrode terminal 801 may be connected to the first tab 61 through the first adapter 90. The second end cover assembly may include an end cover 70, a second electrode terminal 802, and a second adapter 100. The second electrode terminal 802 may be connected to the second tab 62 through the second adapter 100.

Referring to FIG. 6 to FIG. 12, the first adapter 90 and the second adapter 100 each may include at least two non-bending portions and a bending portion 130 connected between every two adjacent non-bending portions, and the number of the non-bending portions of the second adapter 100 is greater than the number of the non-bending portions of the first adapter 90. Both the first adapter 90 and the second adapter 100 after being put into the housing are of a stacking structure. The stacking structure occupies a small space, which can increase space utilization of the battery cell 40 and further increase energy density of the battery cell 40. Compared with the number of the non-bending portions of the second adapter 100, reducing the number of the non-bending portions of the first adapter 90 can reduce bending times of the first adapter 90, and reduce space usage of the first adapter 90, thereby further increasing space utilization of the battery cell, increasing energy density of the battery cell 40, and prolonging battery life.

Referring to FIG. 6 to FIG. 11, for example, the at least two non-bending portions of the second adapter 100 include a third non-bending portion 110, a fourth non-bending portion 140, and a fifth non-bending portion 120, where the third non-bending portion 110 is connected to the second electrode terminal 802, the fourth non-bending portion 140 is connected to the second tab 62, and the fifth non-bending portion 120 is provided between the third non-bending portion 110 and the fourth non-bending portion 140. The second adapter 100, the second tab 62, and the second electrode terminal 802 are generally connected by welding, such as laser welding or ultrasonic welding. When the second adapter 100 is being welded to the second tab 62, only the fourth non-bending portion 140 needs to be welded to the second tab 62. When the second adapter 100 is being welded to the second electrode terminal 802, only the third non-bending portion 110 needs to be welded to the second electrode terminal 802. For the stacked second adapter 100, the second electrode terminal 802 and the second tab 62 do not need to be welded to the entire second adapter 100, greatly reducing the welding difficulty.

In some embodiments, the second electrode terminal 802 may alternatively run through and be connected to the non-bending portion of the second adapter 100. For example, the second electrode terminal 802 includes a second terminal body 84 and a second protruding portion 86, the non-bending portions of the second adapter 100 are all provided with a third through hole, and the second protruding portion 86 is provided in the third through hole, so as to connect the second protruding portion 86 and the second adapter 100. The second protruding portion 86 fits with the third through hole, which can reduce total height of the second electrode terminal 802 and the second adapter 100 to further increase energy density of the battery cell 40, and can also accurately locate the welding position to simplify a welding process and facilitate assembling. For example, the second protruding portion 86 may be seam-welded to the second adapter 100. Certainly, the second electrode terminal 802 may be directly welded to a side of the non-bending portion of the second adapter 100, instead of being welded to the entire second adapter 100, thereby reducing difficulty of welding. How the second electrode terminal 802 is specifically welded to the second adapter 100 is not limited herein.

In some embodiments, the second electrode terminal 802 may be provided with a second platform portion 85, where the second platform portion 85 abuts against a side of the non-bending portion of the second adapter 100 facing away from the second tab 62, and the second platform portion 85 abuts against the third non-bending portion 110.

In some embodiments, in order to increase the infiltration of electrolyte, the non-bending portion connected to the second tab 62 may be provided with a through hole. For example, the fourth non-bending portion of the second adapter 100 may be provided with a second through hole 121.

Referring to FIG. 6 and FIG. 12 to FIG. 14, for example, the at least two non-bending portions of the first adapter 90 may include a first non-bending portion 91 and a second non-bending portion 92, the first non-bending portion 91 is connected to the first electrode terminal 801, and the second non-bending portion 92 is connected to the first tab 61. The first adapter 90, the first tab 61, and the first electrode terminal 801 are generally connected by welding, such as laser welding or ultrasonic welding. When the first adapter 90 is being welded to the first tab 61, only the second non-bending portion 92 needs to be welded to the first tab 61. When the first adapter 90 is being welded to the first electrode terminal 801, only the first non-bending portion 91 needs to be welded to the first electrode terminal 801. For the stacked first adapter 90, the first electrode terminal 801 and the first tab 61 do not need to be welded to the entire first adapter 90, greatly reducing the welding difficulty.

In some embodiments, the first electrode terminal 801 may run through and be connected to the non-bending portion of the first adapter 90. For example, the first electrode terminal 801 includes a first terminal body 81 and a first protruding portion 83, the first non-bending portion 91 of the first adapter 90 is provided with a first through hole 111, and the first protruding portion 83 is provided in the first through hole 111, so as to connect the first protruding portion 83 to the first adapter 90. The first protruding portion 83 fits with the first through hole 111, which can reduce total height of the first electrode terminal 801 and the first adapter 90 to further improve energy density of the battery cell 40, and can also determine a welding position accurately to simplify a welding process and facilitate assembling. For example, the first protruding portion 83 may be seam-welded to the first adapter 90. Certainly, the first electrode terminal 801 may alternatively be directly welded to a side of the non-bending portion of the first adapter 90, instead of being welded to the entire first adapter 90, thereby reducing the welding difficulty. How the first electrode terminal 801 is welded to the first adapter 90 is not specifically limited herein.

In some embodiments, the first electrode terminal 801 may also be provided with a first platform portion 82, where the first platform portion 82 abuts against a side of the first non-bending portion 91 of the first adapter 90 facing away from the first tab 61. The first platform portion 82 abuts against the first non-bending portion 91 to limit a position of the first protruding portion 83, thereby limiting displacement of the first protruding portion 83 in the first direction and preventing the first electrode terminal 801 from slipping out of the first adapter 90 before welding.

In some embodiments, in order to increase the infiltration of electrolyte, the non-bending portion connected to the first tab 61 may be provided with a through hole. For example, the second non-bending portion 92 of the first adapter 90 may be provided with a second through hole 121.

In some embodiments, referring to FIG. 7 to FIG. 12, minimum thickness of the bending portion 130 of the adapter may be smaller than that of the non-bending portion. If the bending portion 130 and the non-bending portion are of equal thickness, when the adapter is being bent, the bending portion 130 may protrude in a direction towards the non-bending portion connected to the bending portion 130, and a height of the bending portion 130 after being bent is greater than that of the non-bending portion connected to the bending portion 130, causing the stacked adapter to be high and occupy more space. By contrast, the bending portion 130 in this embodiment has a smaller minimum thickness, so that the adapter can be bent more easily due to smaller bending pressure. The bending portion 130 is bent into an arc, which can reduce the possibility that the bending portion 130 protrudes in a direction towards the non-bending portion connected to the bending portion 130, and the stacked adapter formed by bending has a smaller gap at a bending position, thereby reducing the space occupied by the bending portion 130, increasing the space utilization of the battery cell, and improving the energy density of the battery cell. In this way, the space occupied by the stacked adapter can be reduced, the space utilization of the battery cell can be increased, and the energy density of the battery cell can be improved.

For example, a minimum thickness of the bending portion 130 of the first adapter 90 may be smaller than that of the non-bending portion. Specifically, the minimum thickness of the bending portion 130 of the first adapter 90 may be smaller than a minimum thickness of either one of the first non-bending portion 91 and the second non-bending portion 92, or the minimum thickness of the bending portion 130 of the first adapter 90 may be smaller than a minimum thickness of the first non-bending portion 91 or a minimum thickness of the second non-bending portion 92.

For example, a minimum thickness of the bending portion 130 of the second adapter 100 may be smaller than that of the non-bending portion. The minimum thickness of the bending portion 130 of the second adapter 100 may be smaller than a minimum thickness of any one of the third non-bending portion 110, the fourth non-bending portion 140, and the fifth non-bending portion 120.

In some embodiments, the bending portion 130 may include a transition section 131 and a middle section 132, where two ends of the middle section 132 each are connected to one transition section 131, the transition section 131 is connected to the non-bending portion, and thickness of the transition section 131 decreases in a direction leaving the non-banding portion connected to the transition section 131; and the bending portion 130 and the non-bending portion connected to the bending portion 130 are connected in a smooth transition. This can reduce stress at a joint between the bending portion 130 and the non-bending portion connected to the bending portion 130, thereby reducing the possibility of fracture of the first adapter 90 and the second adapter 100. It can be understood that the bending portion 130 and the non-bending portion may be made into an integral structure; or certainly, the bending portion 130 and the non-bending portion as separate structures may be connected, for example, by welding, which is not specifically limited herein.

Figure 15:
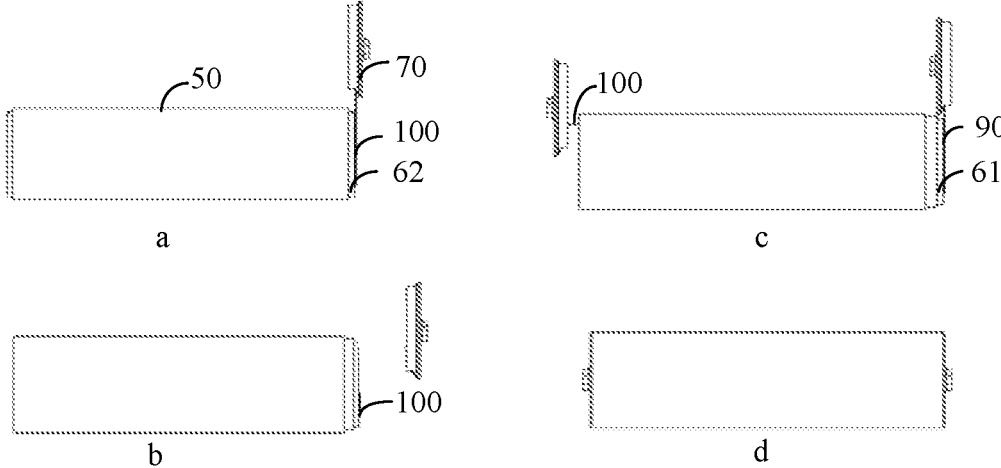
FIG. 15 is a processing diagram of a battery cell.

Referring to FIG. 15, part a of FIG. 15 is a schematic diagram of the second adapter 100 being laser-welded to the second tab 62, part b of FIG. 15 is a schematic diagram of the second adapter 100 obtained after secondary bending, part c of FIG. 15 is a schematic diagram of the first adapter 90 being laser-welded to the first tab 61, and part d of FIG. 15 is a schematic diagram of the first adapter 90 and the second adapter 100 after being bent and put into a housing. In an embodiment of this application, a process of putting the first adapter 90 and the second adapter 100 into the housing may include the following steps:

S100. Connect the second adapter 100 to the second tab 62 of the electrode assembly 60 through laser welding.

S200. Perform primary bending for the second adapter 100.

S300. Perform secondary bending for the second adapter 100.

S400. Insert the second adapter 100 and the electrode assembly 60 into the housing so that an end of the body portion that extends to form the first tab 61 is higher than a housing opening of the housing 50.

S500. Connect the first adapter 90 to the first tab 61 of the electrode assembly 60 through laser welding.

S600. Perform primary bending for the first adapter 90.

S700. Bend the first adapter 90 and the second adapter 100 and putting them into the housing.

In this embodiment, the second adapter 100 and the electrode assembly 60 do not need to be flipped during battery assembling, implementing easy assembling; and the first adapter 90 and the electrode assembly 60 need to be bent only once during battery assembling, so that a welding position on the electrode assembly 60 can be accurately determined, facilitating placement into the housing.

In some embodiments, resistivity of the second adapter 100 is smaller than that of the first adapter 90, to reduce a resistance difference between the two adapters, so that heat generated by the first adapter 90 is close to that generated by the second adapter 100, thereby improving consistency of the battery cell 40. For example, the first adapter 90 is a positive adapter, and the second adapter 100 is a negative adapter. For example, the first adapter 90 is made of aluminum, and the second adapter 100 is made of copper. The resistivity of the positive adapter is greater than that of the negative adapter. Compared with a positive adapter of the same specification, a negative adapter generates more heat, leading to problems in the positive and negative adapters, such as uneven temperature distribution and excessive local temperature rise.

In some embodiments, length of the second adapter 100 is designed to be greater than that of the first adapter 90 to achieve more balanced heat distribution for the positive and negative adapters. For example, in a case that the first adapter 90 is a positive adapter and the second adapter 100 is a negative adapter, the length of the negative adapter can be set to be greater than that of the positive adapter.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A battery cell, comprising:
an electrode assembly, comprising a first tab and a second tab located on two ends of the electrode assembly, respectively, in a first direction;
a first electrode terminal and a second electrode terminal located on two sides of the electrode assembly, respectively, in the first direction;
a first adapter configured to couple the first tab and the first electrode terminal; and
a second adapter configured to couple the second tab and the second electrode terminal;
wherein:
the first adapter and the second adapter each comprise at least two non-bending portions and at least one bending portion each connecting two adjacent ones of the at least two non-bending portions, all the at least two non-bending portions of the first adapter are stacked in the first direction, and all the at least two non-bending portions of the second adapter are stacked in the first direction; and
a number of the at least two non-bending portions of the second adapter is greater than a number of the at least two non-bending portions of the first adapter.

2. The battery cell according to claim 1, wherein:
the at least two non-bending portions of the first adapter comprise:
a first non-bending portion coupled to the first electrode terminal; and
a second non-bending portion coupled to the first tab; and
the at least two non-bending portions of the second adapter comprise:
a third non-bending portion coupled to the second electrode terminal;
a fourth non-bending portion coupled to the second tab; and
a fifth non-bending portion provided between the third non-bending portion and the fourth non-bending portion.

3. The battery cell according to claim 2, wherein:
the first non-bending portion is welded to the first electrode terminal, and the second non-bending portion is welded to the first tab; and
the third non-bending portion is welded to the second electrode terminal, and the fourth non-bending portion is welded to the second tab.

4. The battery cell according to claim 2, wherein each of the second non-bending portion and the fourth non-bending portion is provided with a through hole.

5. The battery cell according to claim 1, wherein the first electrode terminal runs through and is coupled to one non-bending portion of the at least two non-bending portions of the first adapter.

6. The battery cell according to claim 5, wherein:
the first electrode terminal comprises a terminal body, a platform portion, and a protruding portion;
the terminal body is coupled to the platform portion and the protruding portion;
the protruding portion runs through and is coupled to the one non-bending portion of the first adapter; and
the platform portion abuts against a side of the one non-bending portion of the first adapter facing away from the first tab.

7. The battery cell according to claim 1, wherein the second electrode terminal runs through and is coupled to one non-bending portion of the at least two non-bending portions of the second adapter.

8. The battery cell according to claim 7, wherein:
the one non-bending portion of the second adapter is provided with a through hole;
the second electrode terminal comprises a terminal body and a protruding portion;
the terminal body is coupled to the protruding portion; and
the protruding portion is provided in the through hole and seam-welded to the second adapter.

9. The battery cell according to claim 1, wherein a resistivity of the second adapter is smaller than a resistivity of the first adapter.

10. The battery cell according to claim 9, wherein the first adapter is made of aluminum, and the second adapter is made of copper.

11. The battery cell according to claim 1, wherein a length of the second adapter is greater than a length of the first adapter.

12. The battery cell according to claim 1, wherein in each of the first adapter and the second adapter, a minimum thickness of each of the at least one bending portion is smaller than a minimum thickness of each of the at least two non-bending portions.

13. The battery cell according to claim 1, wherein each of the at least one bending portion of the first adapter or the second adapter comprises a transition section coupled to a corresponding non-bending portion of the at least two non-bending portions, and a thickness of the transition section decreases in a direction leaving the corresponding non-bending portion coupled to the transition section.

14. A battery, comprising a battery cell comprising:
an electrode assembly, comprising a first tab and a second tab located on two ends of the electrode assembly, respectively, in a first direction;
a first electrode terminal and a second electrode terminal located on two sides of the electrode assembly, respectively, in the first direction;
a first adapter configured to couple the first tab and the first electrode terminal; and
a second adapter configured to couple the second tab and the second electrode terminal;
wherein:
the first adapter and the second adapter each comprise at least two non-bending portions and at least one bending portion each connecting two adjacent ones of the at least two non-bending portions, all the at least two non-bending portions of the first adapter are stacked in the first direction, and all the at least two non-bending portions of the second adapter are stacked in the first direction; and
a number of the at least two non-bending portions of the second adapter is greater than a number of the at least two non-bending portions of the first adapter.

15. The battery according to claim 14, wherein:
the at least two non-bending portions of the first adapter comprise:
a first non-bending portion coupled to the first electrode terminal; and
a second non-bending portion coupled to the first tab; and
the at least two non-bending portions of the second adapter comprise:

a third non-bending portion coupled to the second electrode terminal;

a fourth non-bending portion coupled to the second tab; and a fifth non-bending portion provided between the third non-bending portion and the fourth non-bending portion.

16. The battery according to claim 14, wherein each of the second non-bending portion and the fourth non-bending portion is provided with a through hole.

17. The battery according to claim 14, wherein the first electrode terminal runs through and is coupled to one non-bending portion of the at least two non-bending portions of the first adapter.

18. The battery according to claim 17, wherein:

the first electrode terminal comprises a terminal body, a platform portion, and a protruding portion;

the terminal body is coupled to the platform portion and the protruding portion;

the protruding portion runs through and is coupled to the one non-bending portion of the first adapter; and the platform portion abuts against a side of the one non-bending portion of the first adapter facing away from the first tab.

19. An electric apparatus, comprising the battery cell according to claim 1 and configured to supply electric energy.

20. A battery cell, comprising:

an electrode assembly, comprising a first tab and a second tab located on two ends of the electrode assembly, respectively, in a first direction;

a first electrode terminal and a second electrode terminal located on two sides of the electrode assembly, respectively, in the first direction;

a first adapter configured to couple the first tab and the first electrode terminal, the first adapter being directly connected to the first electrode terminal; and a second adapter configured to couple the second tab and the second electrode terminal, the second adapter being directly connected to the second electrode terminal;

wherein:

the first adapter and the second adapter each comprise at least two non-bending portions and at least one bending portion each connecting two adjacent ones of the at least two non-bending portions; and a number of the at least two non-bending portions of the second adapter is greater than a number of the at least two non-bending portions of the first adapter.

* * * * *